United States Patent [19]

Serino et al.

[11] Patent Number: 5,705,975
[45] Date of Patent: Jan. 6, 1998

[54] ANTI-THEFT DEVICE FOR ELECTRONIC APPARATUSES

[75] Inventors: Tsutomu Serino; Kunihiro Andoh, both of Tokyo, Japan

[73] Assignee: Clarion Co., Ltd., Saitame-ken, Japan

[21] Appl. No.: 620,293

[22] Filed: Mar. 22, 1996

[30] Foreign Application Priority Data

| Mar. 24, 1995 | [JP] | Japan | 7-091604 |
| Mar. 24, 1995 | [JP] | Japan | 7-091605 |
| Mar. 24, 1995 | [JP] | Japan | 7-091607 |

[51] Int. Cl.$^6$ ................................ B60R 25/10
[52] U.S. Cl. ............ 340/426; 340/455; 340/565; 340/568; 307/10.2; 367/93; 381/86; 455/346; 455/349
[58] Field of Search .................... 340/426, 455, 340/565, 568, 571; 307/10.2; 367/93; 381/86; 455/345, 346, 347, 349

[56] References Cited

U.S. PATENT DOCUMENTS

| 5,143,343 | 9/1992 | Katz | 248/551 |
| 5,157,375 | 10/1992 | Drori | 340/429 |
| 5,537,673 | 7/1996 | Nagashima et al. | 455/346 |

FOREIGN PATENT DOCUMENTS

| 68104 | 2/1994 | Japan . |
| 6180787 | 6/1994 | Japan . |
| 6180979 | 6/1994 | Japan . |
| 719886 | 4/1995 | Japan . |

*Primary Examiner*—Thomas Mullen
*Assistant Examiner*—Daniel J. Wu
*Attorney, Agent, or Firm*—Price, Gess & Ubell

[57] ABSTRACT

An anti-theft device for electronic equipment mounted in a vehicle, such as audio systems, includes a housing for storing electronic component of the audio system and a detachable control panel that can be removed when the operator leaves the vehicle. A replacement detachable panel can be mounted on the housing to enable a locking of the housing to the vehicle dashboard. The second detachable panel can include an alarm, an ultrasonic sensing device, and a self-contained power source so that a security alarm system can be activated by the installation of the second detachable panel as a further deterrent to theft.

32 Claims, 15 Drawing Sheets

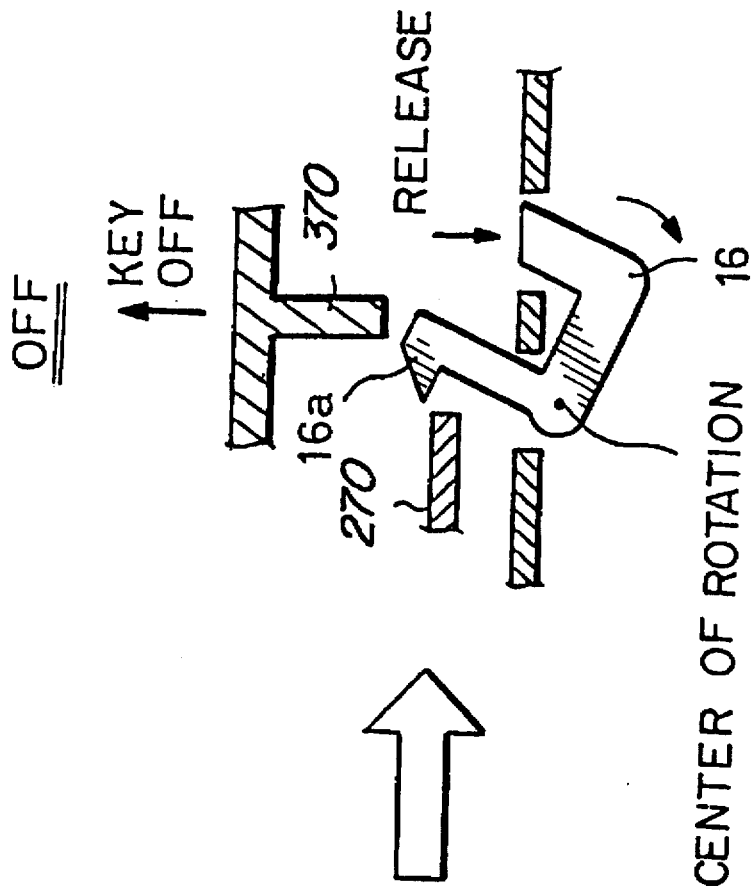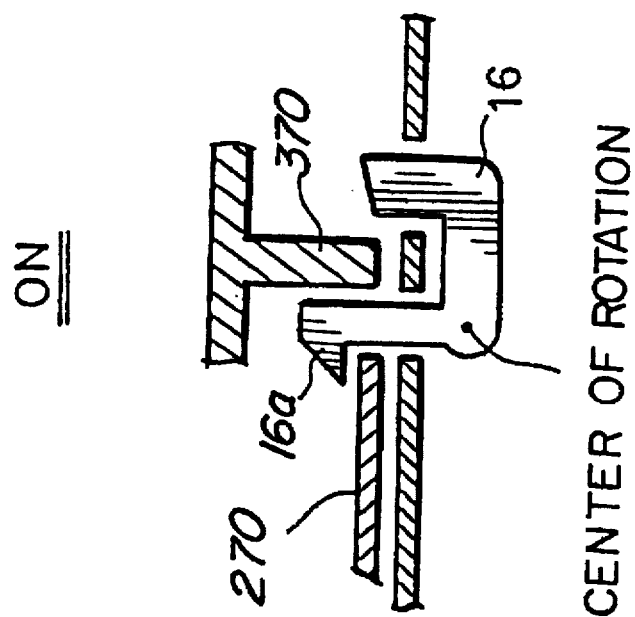

CENTER OF ROTATION

CENTER OF ROTATION

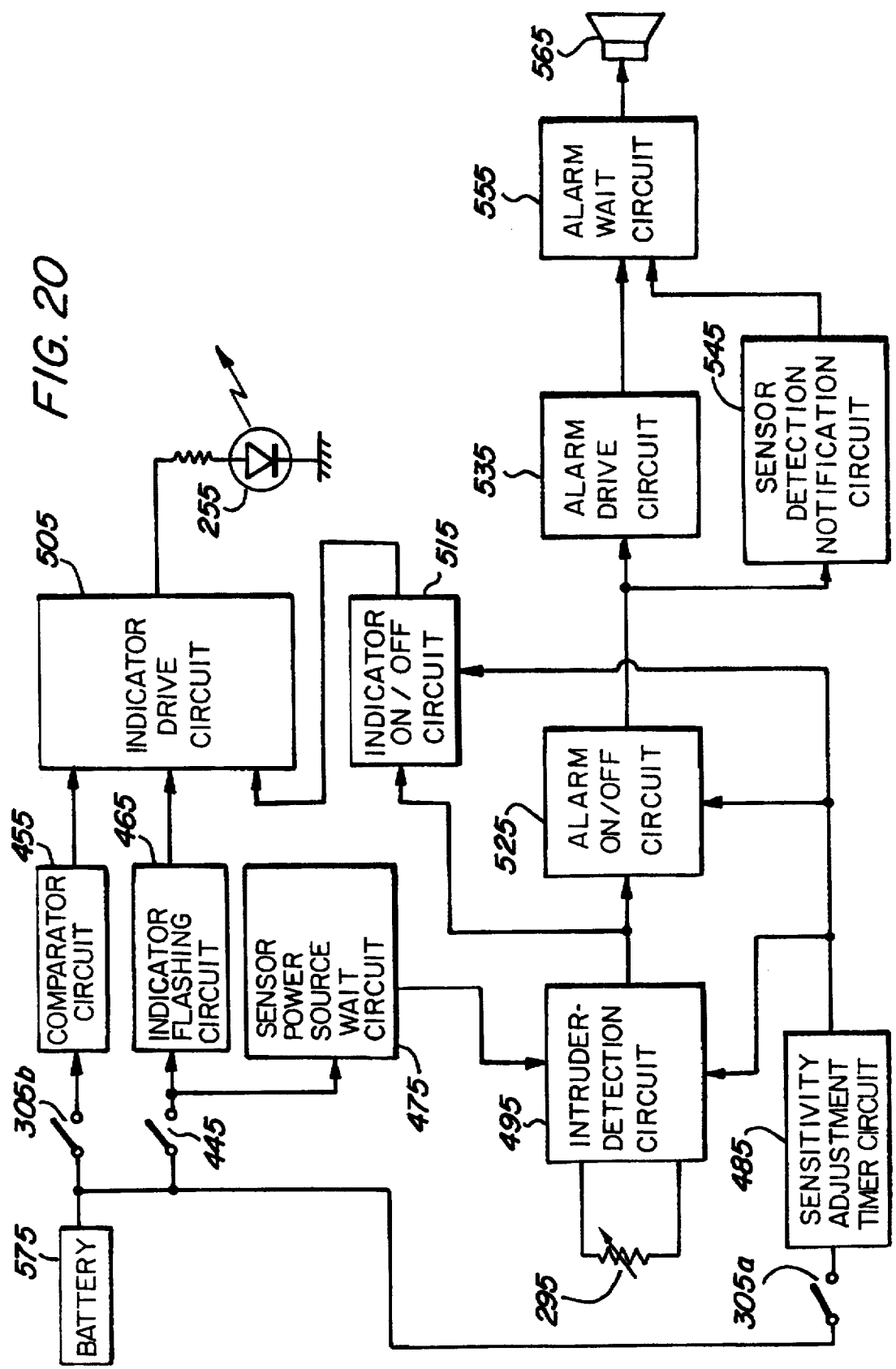

ANTI-THEFT DEVICE FOR ELECTRONIC APPARATUSES

BACKGROUND OF THE INVENTION

1. Field of the Invention

An electronic vehicle audio system having an anti-theft detachable control panel accessory.

2. Description of Related Art

It often happens that vehicle-mounted electronic apparatuses, particularly audio apparatuses, are stolen by being taken from the console panel of the vehicle when the rightful user is away from the vehicle. Thus there have been proposals in the prior art for anti-theft mechanisms constructed in such a way that the operating panel of an audio device can be attached to and detached from the main body of the electronic apparatus. Further, remote controls for operating television from a distance have become widespread, and many of these remote controls are constructed in such a way that they can be fitted to the main body of the receiver when they are not in use. Thus, if the rightful user carries just the operating unit on their person when they are away from the vehicle there will be no advantage to any thief who might steal just the main body. Further, even if a thief sees just the main body of the electronic apparatus from outside the vehicle, that thief will not know clearly whether there is an apparatus or not, with the result that the action of theft itself is prevented.

For reasons such as the above, detachable mechanisms for electronic apparatuses have already been developed in order to allow the operating unit, which is separate to the main body of the electronic apparatus, to be detachably provided on said main body.

However, simply making the operating panel detachable from the main body of the electronic apparatus gives only a minor anti-theft effect.

OBJECTS AND SUMMARY OF THE INVENTION

The aim of the present invention is to improve the anti-theft effects of electronic apparatuses with mechanisms in which the operating panel is detachable from the main body of the electronic apparatus, which it does by constructing an anti-theft panel, which is not the operating panel described above, in such a way that it is able to be detached from and locked by key to the above-mentioned main body of the electronic apparatus. For this purpose, according to the present invention, there is provided an anti-theft device for an electronic apparatus having an operating panel (2) which is detachable from the electronic apparatus main body (1), constructed in such a way that said device also has an anti-theft panel (200) constructed in such a way that it can be attached to and detached from the above-mentioned electronic apparatus main body (1) when the above-mentioned operating panel has been removed, the above-mentioned anti-theft panel is equipped with a lock means (370g, 370f) operated by a key (260), and the anti-theft panel is locked on to the electronic apparatus main body by a key operation in the above mentioned lock means.

With the configuration of the present invention, an anti-theft panel is fitted and locked in by key once the operating panel has been removed from the audio device when the driver is away from the car. In this way, a sensor and an alarm device enter the operating mode after a certain time has elapsed and, if there is an intruder, the said intruder will be detected by the sensor and the alarm will be given after a certain time.

Further, the device in this case may be constructed in such a way that the main body of the electronic apparatus is latched on to by a framing bracket and an anti-theft panel is fitted to the main body of the electronic apparatus when the driver is away from the vehicle. Thus, because projections in the above-mentioned panel cover the area where any unfastening part would be inserted, no unfastening part can be inserted and the main body of the electronic apparatus cannot be removed from the framing bracket.

With the device of the present case, it is also possible to supply an intruder-detecting sensor with a power source and thereby put it into the active mode by fitting the above-mentioned panel and locking it to the main body of the electronic apparatus instead of the operating panel. Then, when the sensor gives a detection output, the alarm unit is only active for a predetermined time. Thus, if a person detected by the sensor at this time is the driver or other person knowing of the existence of the device of the present case, they can be made aware that the sensor is active and turn it off. Subsequently, if the sensor has not been turned off and the above-mentioned detection output is present, the alarm can continue to emit the alarm immediately or after a certain time.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

3

Figure 14:
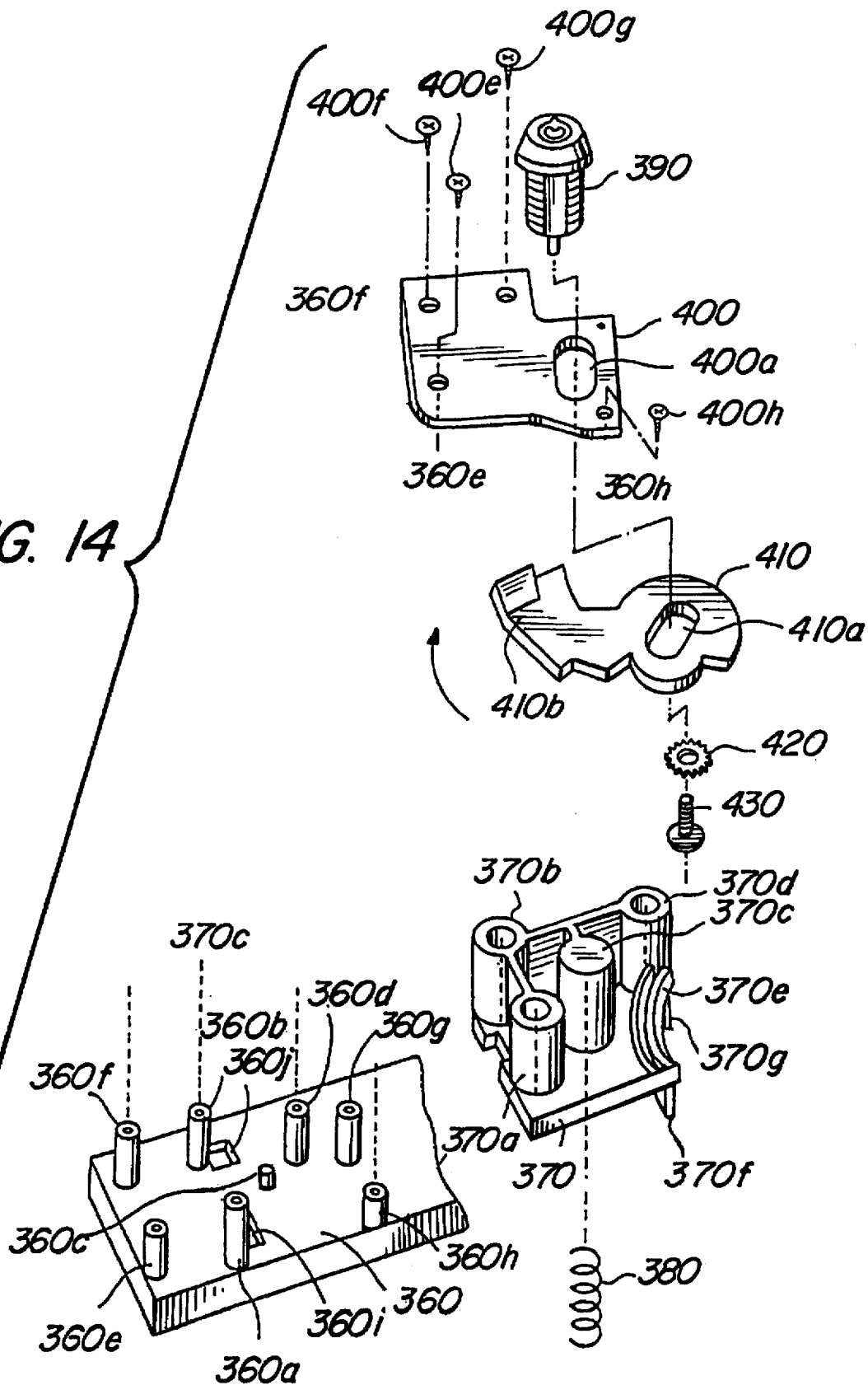

FIG. 14 is an exploded oblique view of the construction of the key lock part.

FIG. 15 is a schematic diagram to explain the action of the key lock part: FIG. 15(a) showing the lock-on state and FIG. 15(b) showing the lock-off state.

Figure 16A:
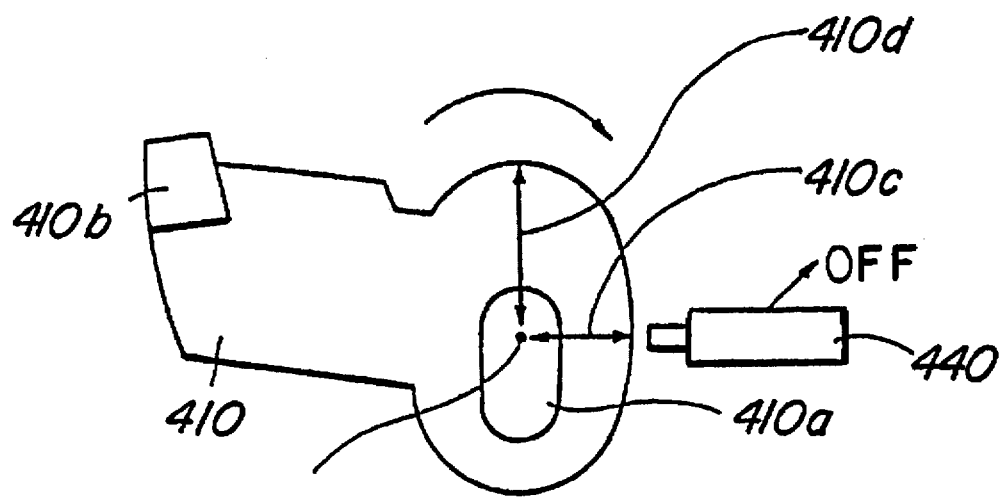
Figure 16B:
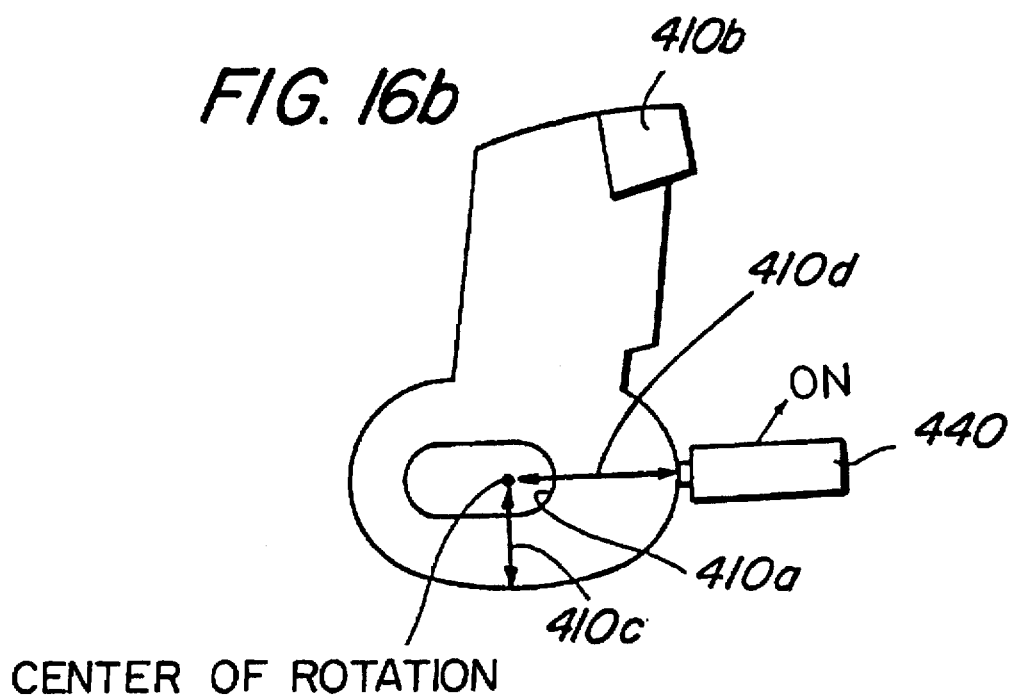

FIG. 16 is a schematic diagram to explain the action of the turn plate when lock detection is carried out: FIG. 16(a) showing the lock-off state and FIG. 16 (b) showing the lock-on state.

Figure 17:
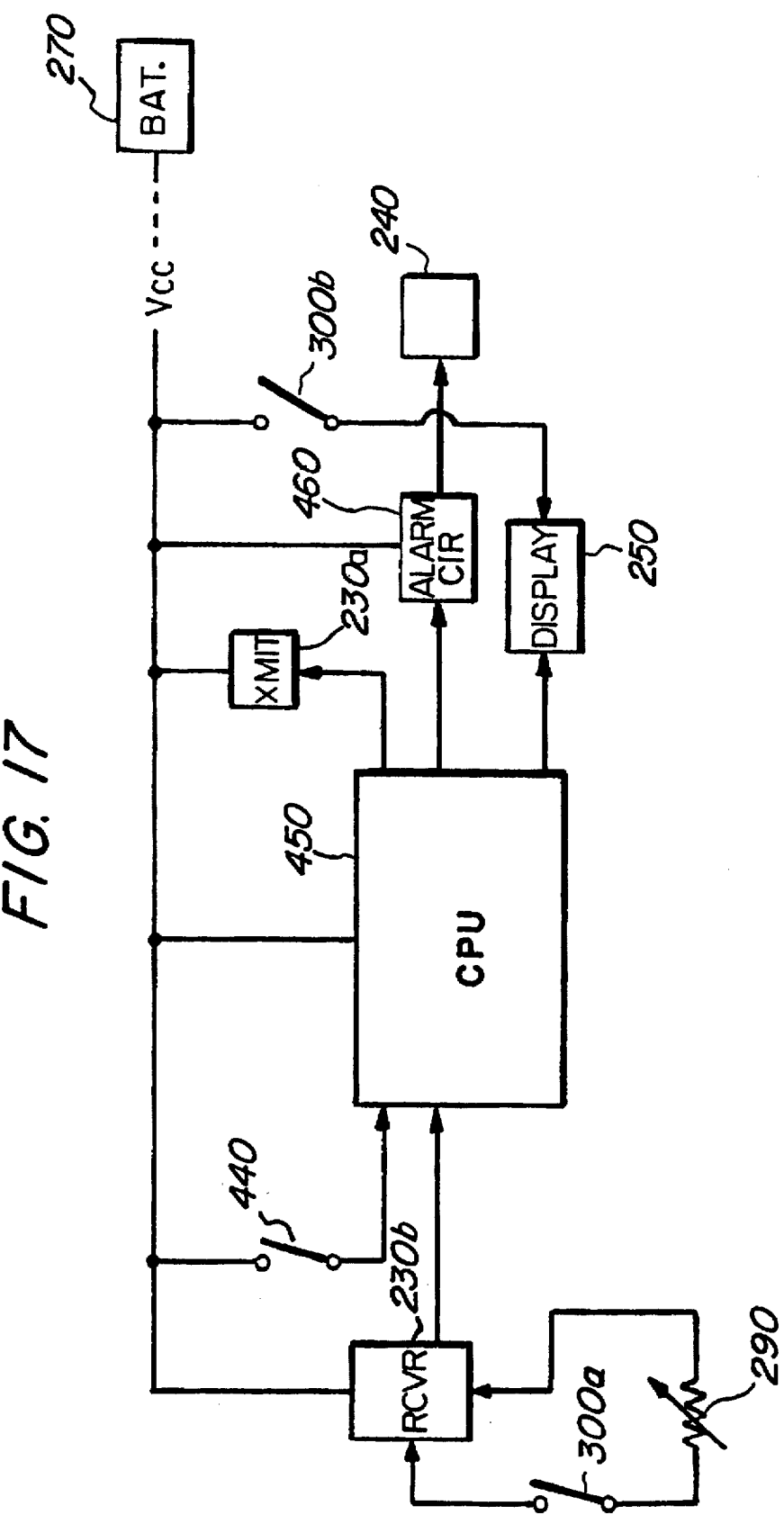

FIG. 17 is a block diagram showing one example of the circuitry incorporated in the anti-theft panel.

Figure 18:
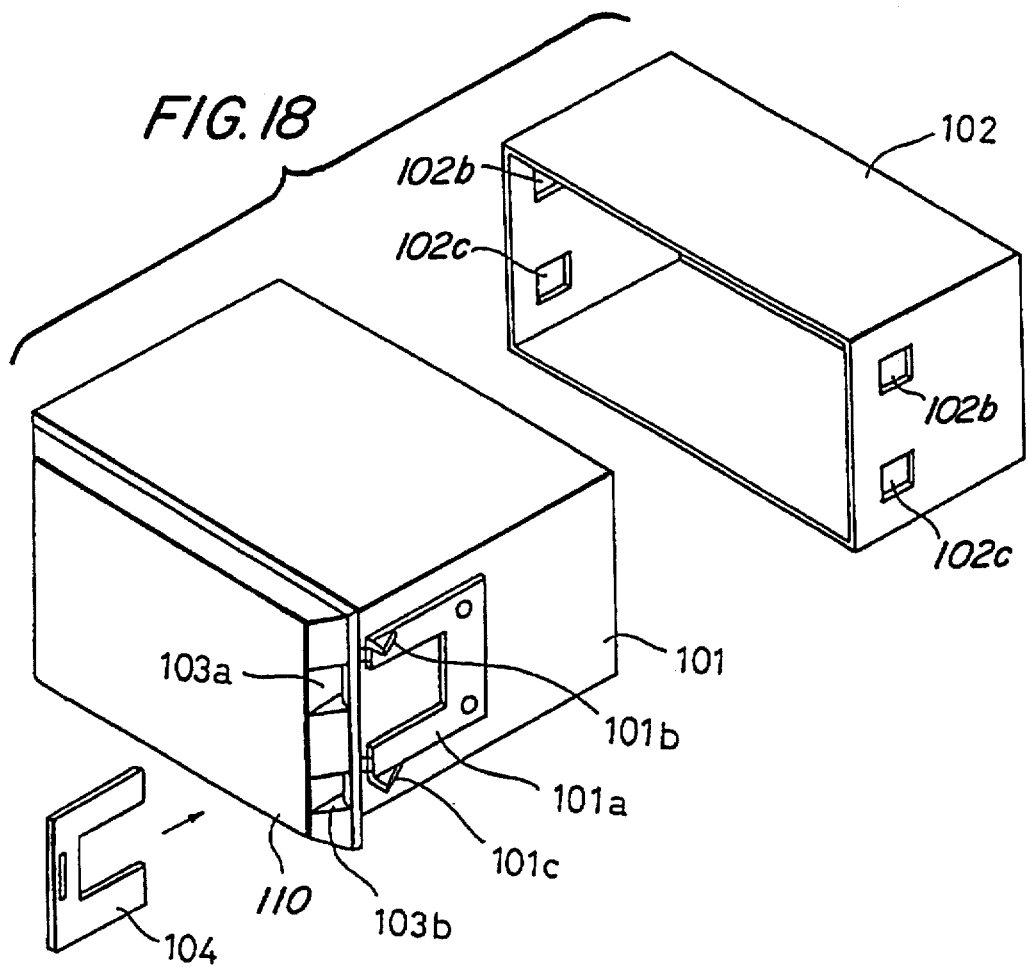

FIG. 18 is an oblique view of one example of a mechanism for attaching the electronic apparatus to a vehicle.

Figure 19:
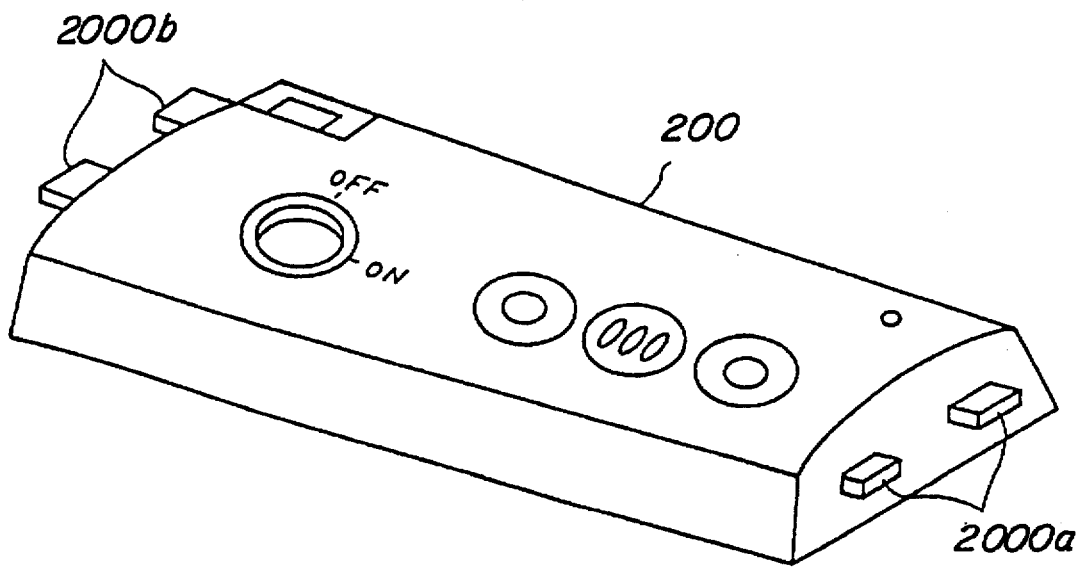

FIG. 19 is a general view of one example of the configuration of the anti-theft panel.

FIG. 20 is a block diagram of another example of the circuitry incorporated in the anti-theft panel.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an anti-theft device for electronic apparatuses.

Figure 1:
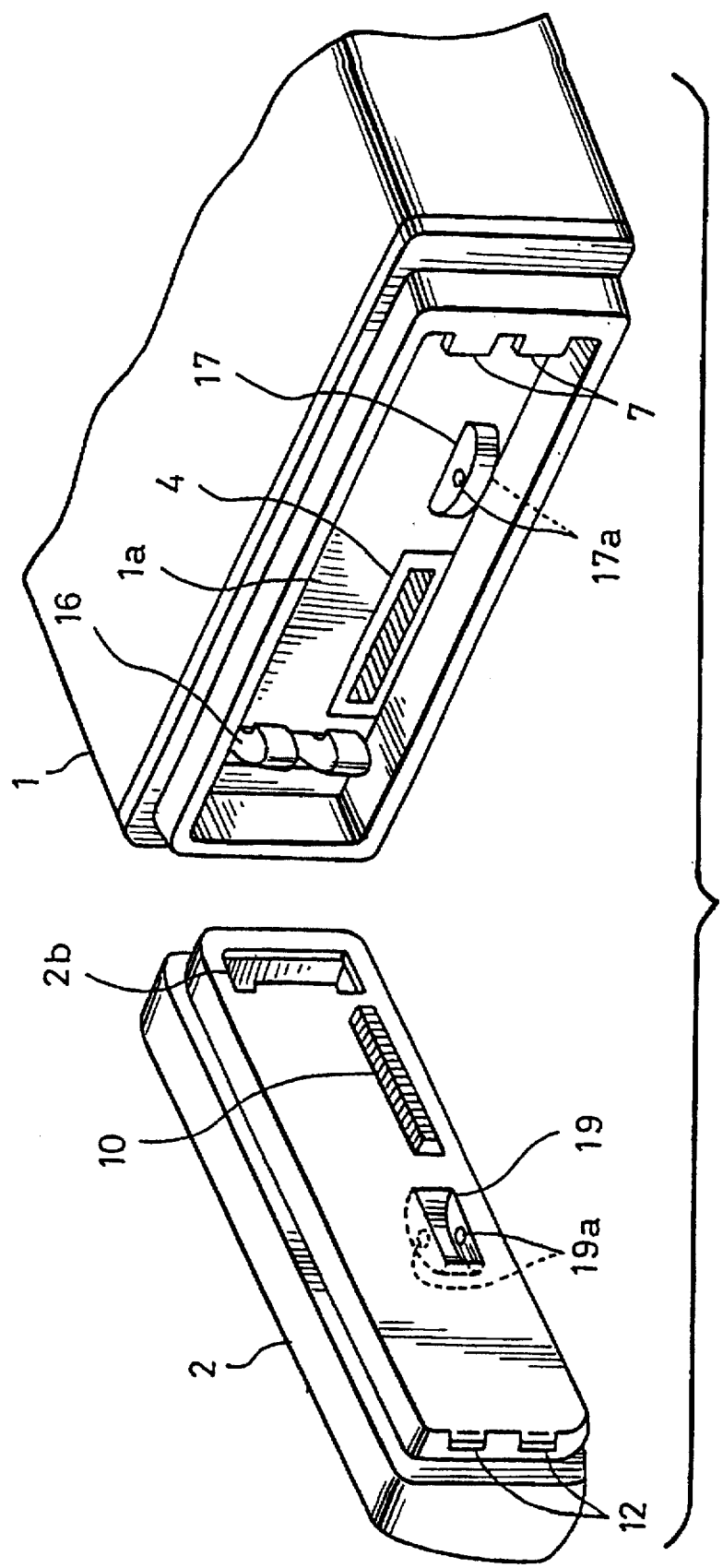
FIG. 1 is an oblique view of the front of the electronic apparatus case and the operating panel of a device of the present case.

Embodiments of the present invention are described below with reference to the Figures. (1) Operating panel detachment mechanism The description begins with the operating panel detachment mechanism. In FIG. 1, 1 is the case of the vehicle-mounted audio apparatus, 2 is the operating panel, and provided on the case face 1a are, in sequence from the left as viewed from the front of the apparatus, a detachment member 16, connector 4, push-out member 17 and clasps 7. It should be noted that "left" and "right" in the following description are the directions as viewed from the front of the apparatus.

Figure 2:
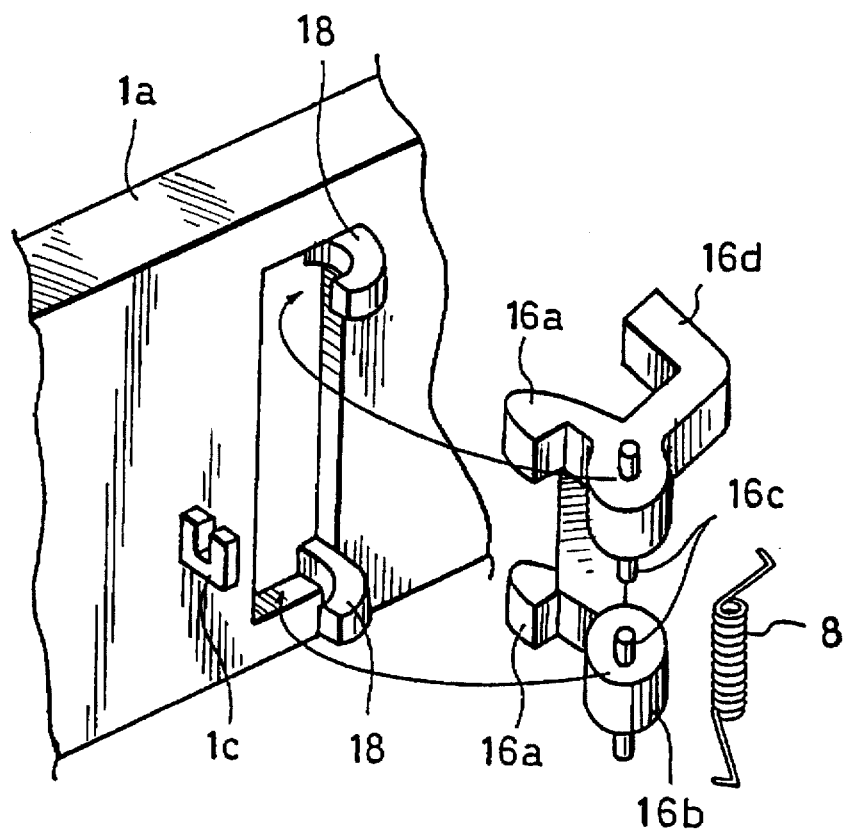
FIG. 2 is an exploded oblique view of the attachment structure of the detachment member of the operating panel of FIG. 1.
Figure 3:
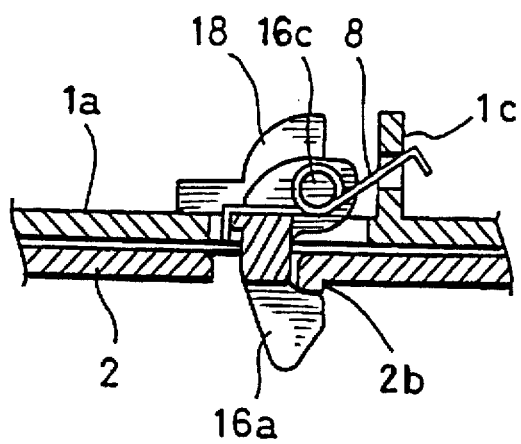
FIG. 3 is a cross section of the device in the attachment structure of the above-mentioned detachment member, seen from above.

The detachment member 16 is provided on the case front 1a as described below. As shown in FIG. 2, a rectangular hole is provided in the case front 1a, and approximately L-shaped supporting members 18 are attached at the top and bottom edges of the rectangular hole. In this instance, they are attached so as to be open on the right. A latching part 1c is provided to the right of the supporting members 18. The detachment member 16 comprises key parts 16a formed with a key shape, cylindrically shaped projecting parts 16b, shaft parts 16c provided on the projecting parts 16b, and a pushed part 16d. In addition, smooth inclined surfaces are formed on the right side surfaces of the key parts 16a. Such a detachment member 16 is provided in such a way as to be able to turn in the rectangular hole provided in the case front 1a by inserting its shaft parts 16c into engagement from the right, which is to say from the direction of the arrows in FIG. 2, which are the open portions of the supporting members 18. At this time, as shown in FIG. 1, the key parts 16a protrude forward from the hole in the case front 1a. In addition, a twisting coil spring 8 is provided between the protruding parts 16b at the top and the bottom of the detachment member 16. As shown in FIG. 3, one end of the twisting coil spring 8 latches on to the rear end of the plate-shaped portion in the middle of the detachment member 16, and the other end latches on to the latching part 1c.

4

Figure 4:
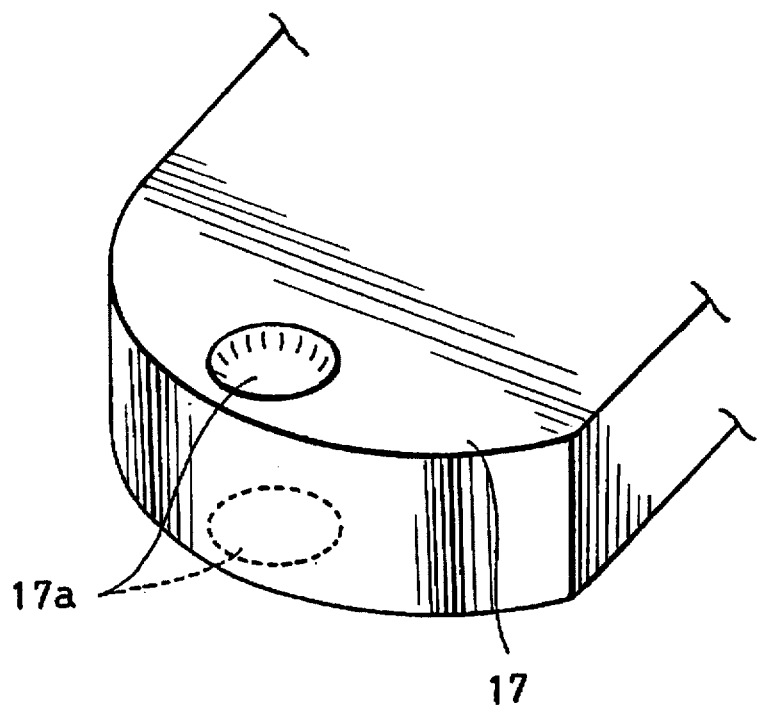
FIG. 4 is an oblique view of the push-out member of the device of FIG. 1.
Figure 5:
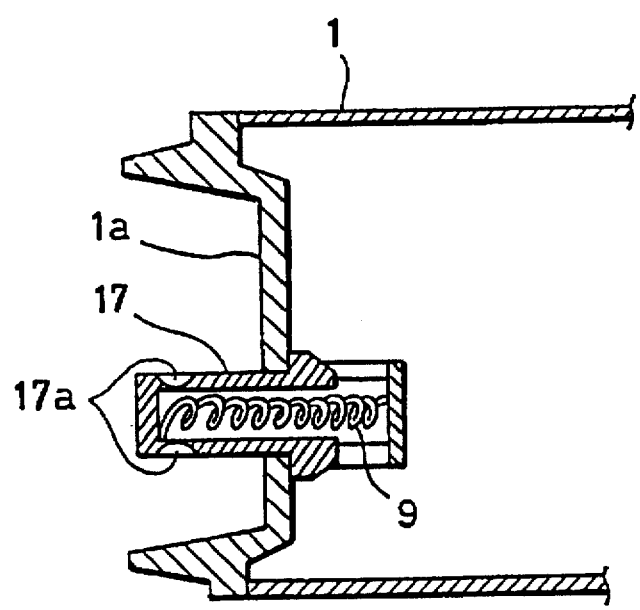
FIG. 5 is a lateral cross section of the push-out member attached to the case.

Further, as shown in FIG. 4 and FIG. 5, the push-out member 17 is one in which the front of a box shaped member has been processed into a semi-cylindrical shape. This push-out member 17 has its rear part planted with freedom to move forward and backward inside the main body case 1, and is urged forward by a coil spring 9. The front end of the push-out member 17 has bowl shaped sunken parts 17a provided on its upper and lower surfaces.

Meanwhile, as shown in FIG. 1, the rear surface of the operating panel 2 is provided with a detachment engagement part 2b which engages with the detachment member 16, a plug 10 which is connected with the connector 4, and a pressed part 19 which is constructed in such a way as to be pressed by the push-out member 17. The pressed part 19 is a semi-cylindrical sunken area provided in a position corresponding to the push-out member 17. Projections 19a which engage with the sunken parts 17a of the push-out member 17 are provided on the upper and lower surfaces of the pressed part 19.

Figure 6:
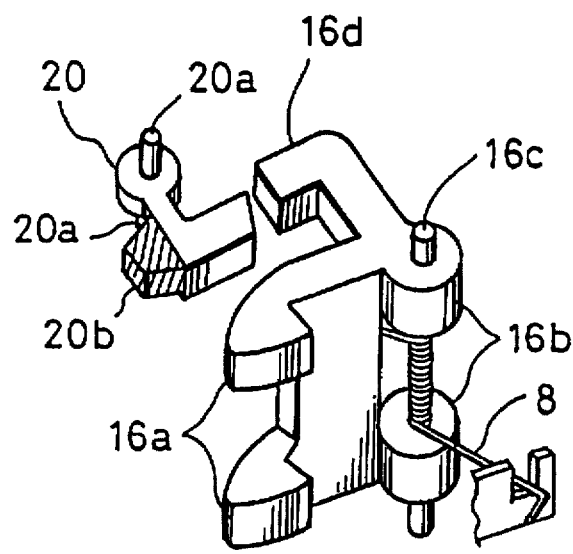
FIG. 6 is an oblique view of the positional relationship between the release lever and the detachment member.
Figure 7:
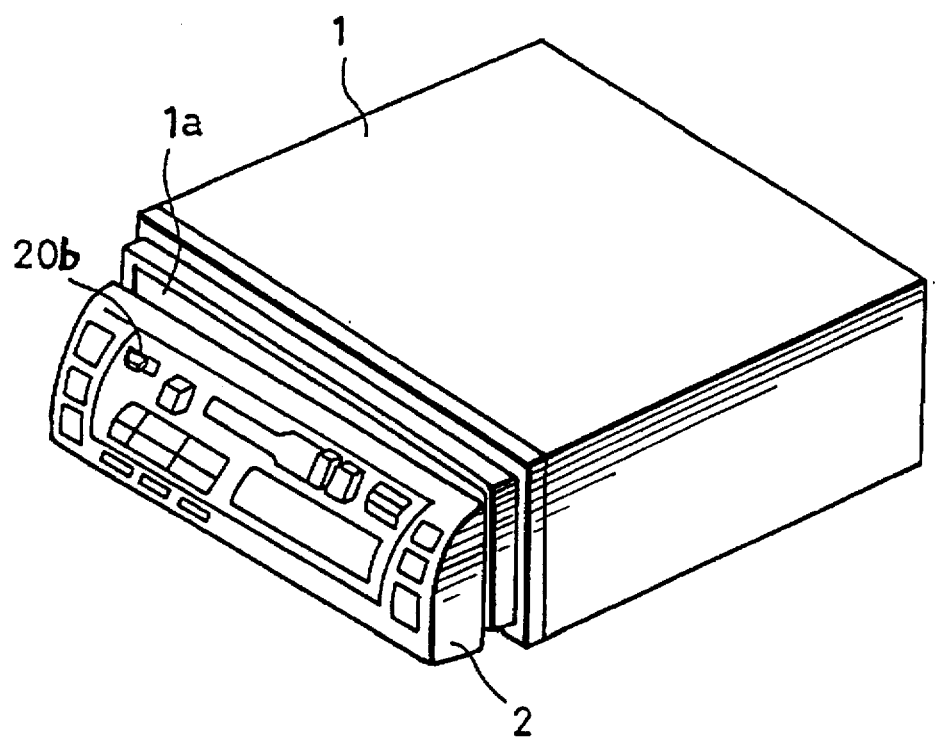
FIG. 7 is an oblique view of the appearance when the operating panel is being fitted to and removed from the front of the case.

As shown in FIG. 7, the lever part 20b of the release lever 20 is provided adjacent the user control members so as to protrude at the front of the operating panel 2. As shown in FIG. 6, this release lever 20 is a wedge shaped member widening at the front, it has perpendicularly protruding shaft parts 20a on both its flanks. The shaft parts 20a are supported with freedom to turn inside the operating panel 2 and thus the release lever 20 has a construction whereby it is able to turn pivotally on the shaft parts 20a. In addition, when the operating panel 2 is fitted to the case front 1a, the rear edge of the release lever 20 faces the pressing surface of the pushed part 16d of the detachment member 16. As depicted by the oblique lines in FIG. 6, a lever part 20b protruding obliquely upward, as mentioned hereinabove, is provided on the front edge of the release lever 20. Because the lever part 20b protrudes from a hole provided in the front of the operating panel 2 as shown in FIG. 7, the arrangement is such that an operator can turn the release lever 20 by pressing the lever part 20b.

Figure 8:
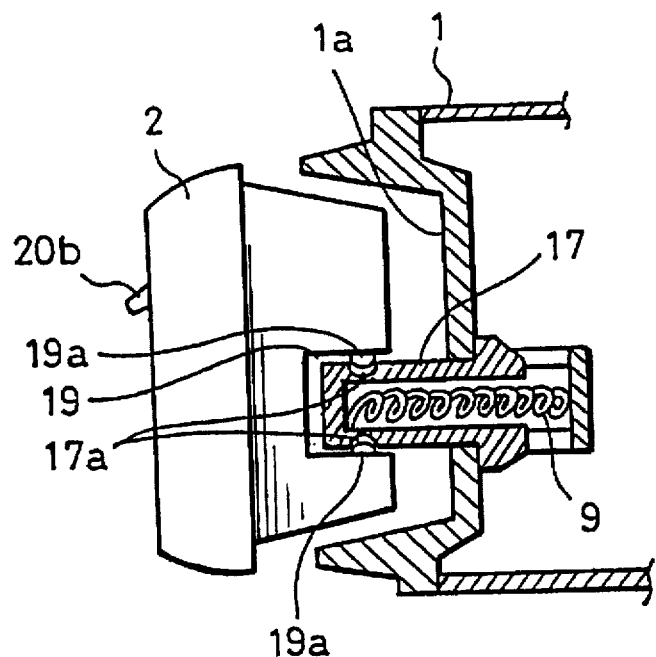
FIG. 8 is a lateral cross section of the state of engagement between the projections of the pressed part and the recesses of the push-out member.
Figure 9:
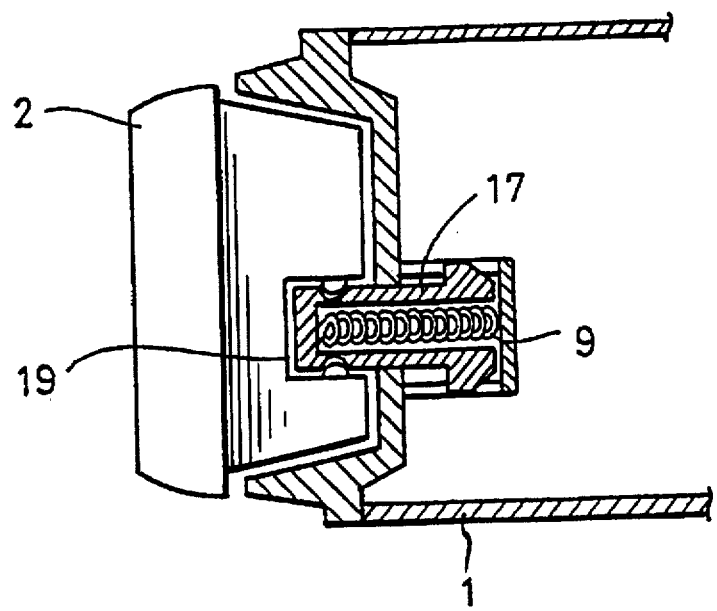
FIG. 9 is a lateral cross section of the operating panel fitted to the case front.

When the operating panel 2 is fitted to the main body case 1, the rear surface of the operating panel 2 faces the case front 1a as shown in FIG. 7, and the clasps 7 are fitted in so as to engage with the channel parts 12 shown in FIG. 1. In addition, when the operating panel 2 is pressed backward, the operating panel 2 turns backward, pivoting around the site of engagement between the channel parts 12 and the clasps 7, and the plug 10 is connected with the connector 4 so that the circuitry of the audio apparatus and the operating panel are electrically connected via the terminals of both members. Meanwhile, when the operating panel 2 is pressed backward, the push-out member 17 withdraws backward against the urging force of the coil spring 9, and, as shown in FIG. 8, the front edge of the push-out member 17 provided in the case front 1a enters the pressed part 19 of the operating panel 2, and the projections 19a of the pressed part 19 engage with the sunken parts 17a of the push-out member 17. In addition, when the key part 16a of the detachment member 16 engages with the right edge of the detachment-engagement part 2b as shown in FIG. 3, the operating panel 2 is fitted on to the main body case 1 as shown in FIG. 9.

Figure 10:
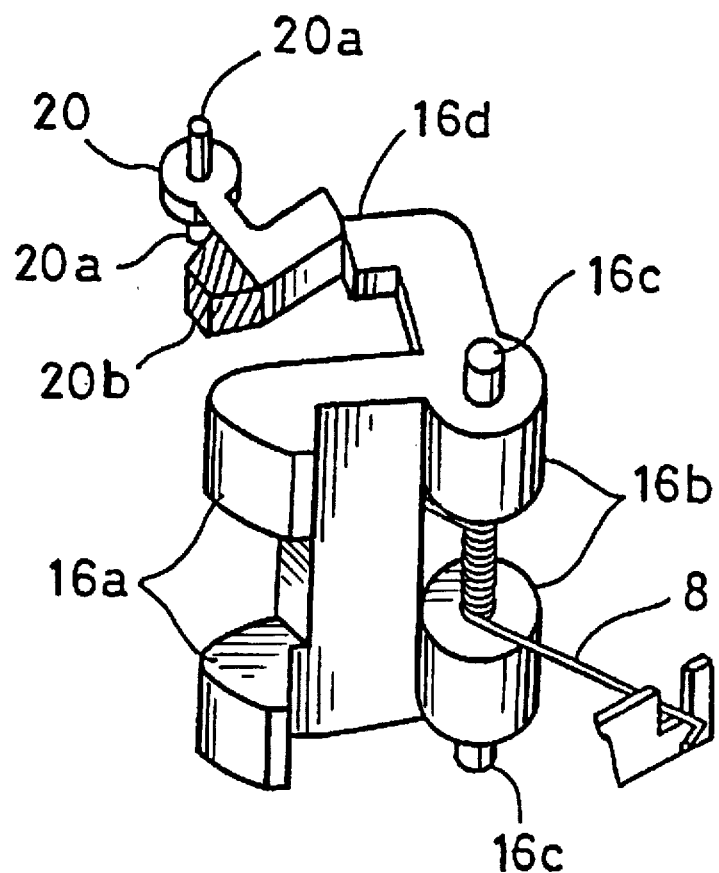
FIG. 10 is an oblique view of the detachment member being turned by the release lever.

Next, when the operating panel 2 is to be removed from the main body case 1, the lever part 20b protruding to the front of the operating panel 2 is pressed and made to turn. Thereupon, as shown in FIG. 10, the release lever 20 is turned and its rear edge slides in contact with the pressing surface of the pushed part 16d of the detachment member 16, and the key parts 16a are made to retreat to the left. Thus, the detachment member 16 turns to the left against the urging force of the twisting coil spring 8, and the key parts 16a separate from the right edge of the locked part 2b. Because the pressed part 19 of the operating panel 2 is urged to the front by the push-out member 17, the operating panel 2 turns toward the front pivoting around the area of engagement between the channel parts 12 and the clasps 7. Here, as shown in FIG. 8, because the projections 19a of the pressed part 19 engage with the sunken parts 17a of the push-out member 17, the operating panel 2 is held from turning to some extent and prevented from falling off. If the operating panel 2 is then pulled out by hand, the projections 19a separate from the sunken parts 17a and the engagement between the clasps 7 and the channel parts 12 is broken so that the operating panel 2 is taken off the main body case 1.

It will be noted that the coil spring 9, the pressing member 17 and the pressed part 19 and the like need not be provided, and the release lever 20 may have a top-to-bottom movement rather than a left-to-right turning movement.

Figure 11A:
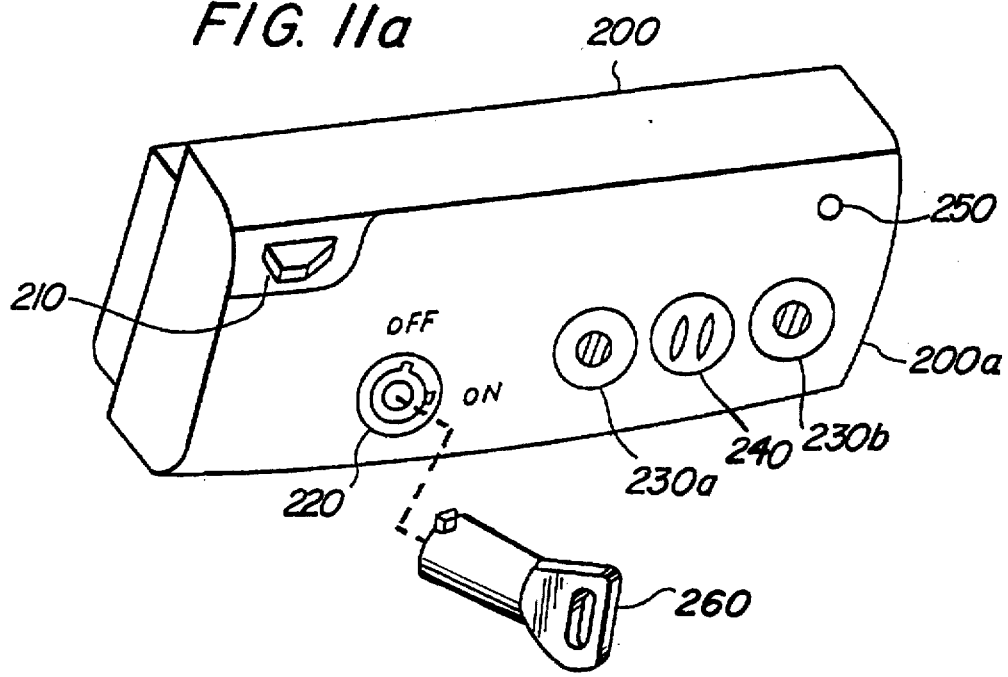
FIG. 11a is an oblique view of the front and FIG. 11b an oblique view of the rear of the anti-theft panel.
Figure 11B:
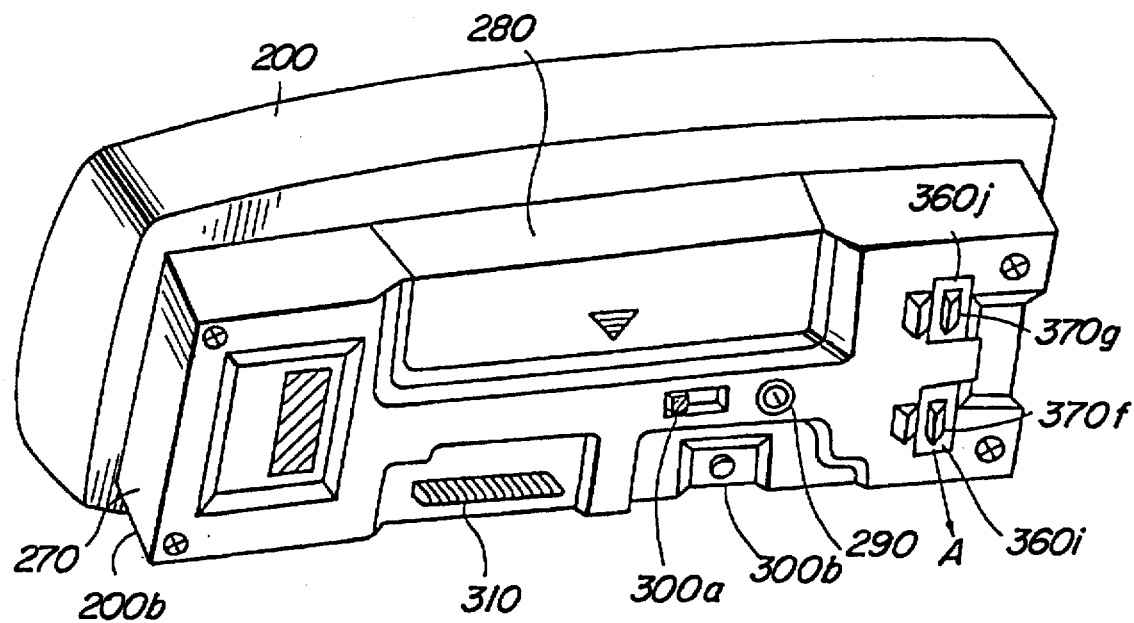

FIG. 11 (a) shows the front 200a and FIG. 11 (b) the rear 200b of an anti-theft panel 200 which is fitted when the above-mentioned operating panel 2 has been removed. The anti-theft panel 200 is roughly the same size and shape as the operating panel 2, and the panel front 200a is provided with a release lever 210, a key-receiving part 220 constructed in such a way as to allow the insertion of a key which is discussed hereinbelow, an ultrasound transmission unit 230a which transmits ultrasound within the vehicle, an ultrasound reception sensor 230b which receives the ultrasound waves transmitted by the above-mentioned transmission unit 230 and reflected within the vehicle, an alarm speaker 240 consisting of a voltage vibrator for example, and an indicator 250. It will be noted that the anti-theft panel 200 has a construction without the pressing member 17 provided in the operating panel 2.

A special key 260 is inserted in the key-receiving part 220, the inserted key 260 can be turned between the ON and OFF positions, in which positions the key 260 can be taken out.

A rear cover 270 is held by screws on to the panel rear face 200b, a battery cover 280 is fitted in the rear cover 270 which rear cover 270 is also provided with, inter alia, a sensor sensitivity adjustment variable resistor 290, a slide switch 300a used when adjusting the sensor sensitivity, a switch 300bb for displaying remaining battery capacity, and a connection connector 310, in addition to which, lock pieces which are discussed hereinbelow are arranged to protrude in the direction of the arrow A to the front of the rear surface when the assembly has been locked by key.

Figure 12A:
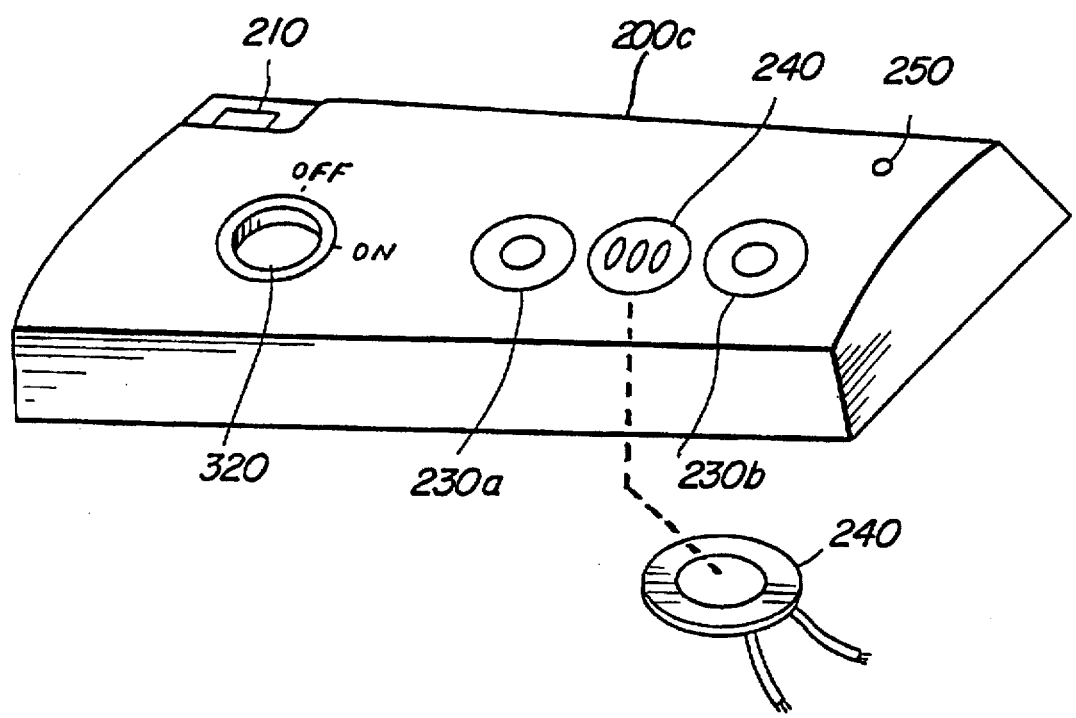
FIG. 12a is an oblique view of the escutcheon of the anti-theft panel.
Figure 12B:
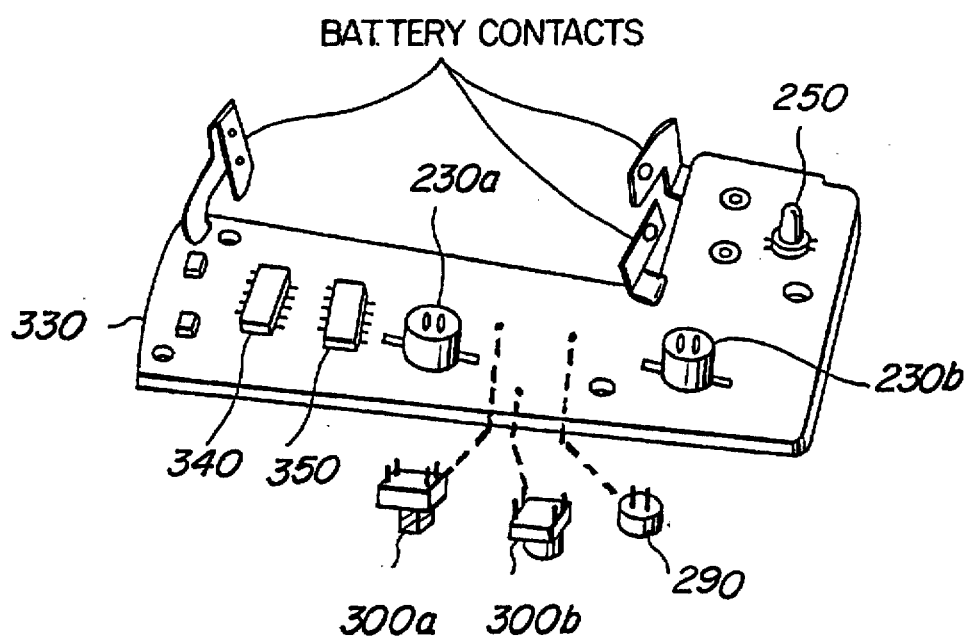
FIG. 12b is an oblique view of the base plate attached on the inside of this escutcheon.

FIGS. 12a and 12b disclose the panel-front escutcheon 200c which goes into the above-mentioned panel front 200a, a key cylinder comprising the key-receiving part 220 shown in FIG. 11 (a) is inserted in the hole 320. Further, a base plate 330 as shown in FIG. 12 (b) is attached to the inside of the escutcheon 200c, and attached to the top of this base plate 330 are the above-mentioned ultrasound transmission unit 230a, ultrasound receiving sensor 230b, an indicator 250 consisting of an LED for example, an alarm speaker 240, switches 300a and 300b, a variable resistor 290, and IC's 340 and 350.

Figure 13:
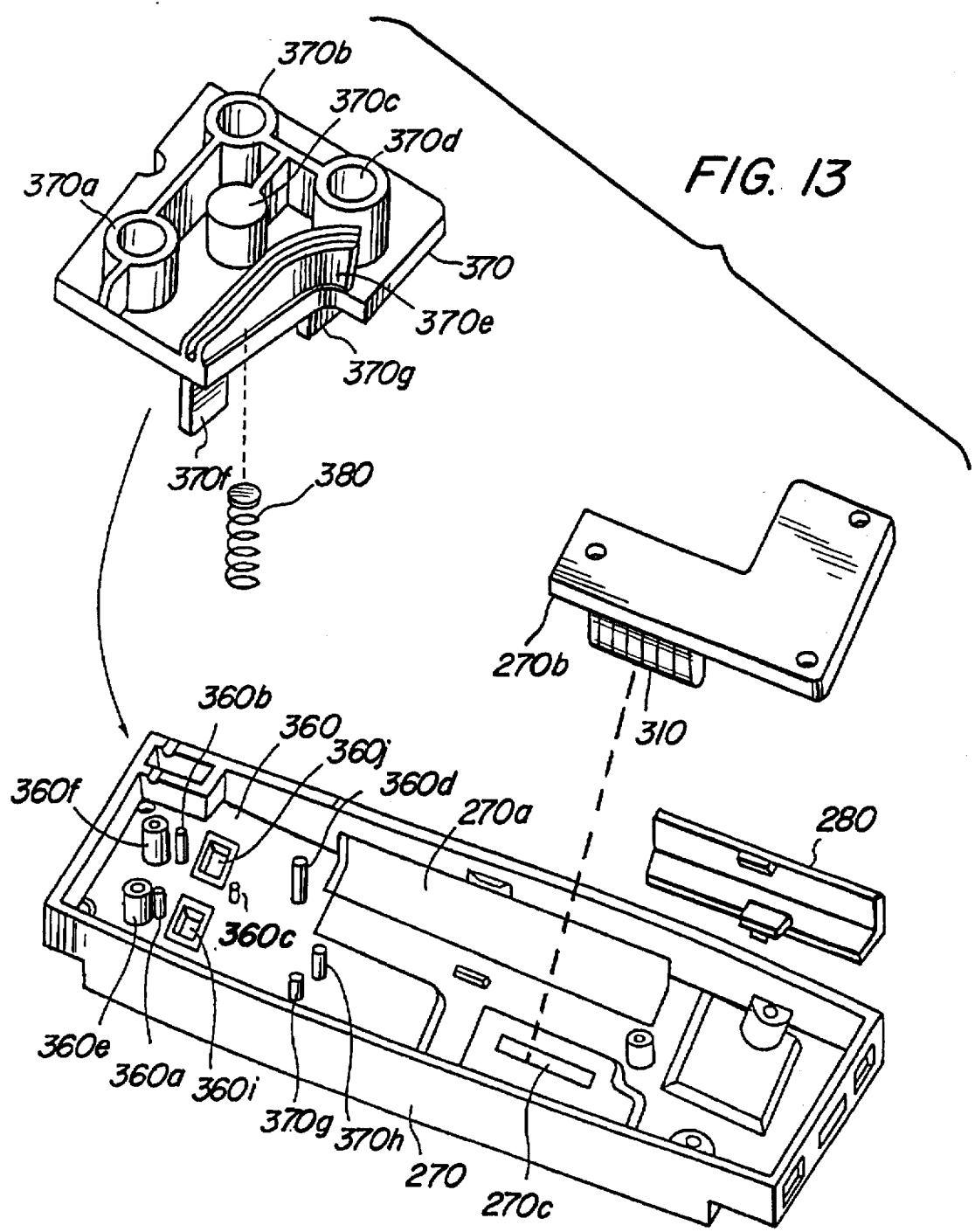
FIG. 13 is an oblique view of the construction on the inside on the rear of the anti-theft panel.

FIG. 13 shows the inside of the rear cover 270: a battery is housed in the battery-housing part 270a to which the battery cover 280 is fitted. 270b is the connector base plate to which the connector 310 is fitted, and this connector 310 is exposed to the outside from the hole 270c. 360 is the attachment area for the key lock part, and the lock plate 370 and the spring 380 are attached as described hereinbelow.

FIG. 14 is an exploded figure showing the construction of the above-mentioned key lock area: 390 is the key cylinder, 400 is the key lock holder, 410 is the turn plate, 420 is a washer, and 430 is an attachment screw.

Bosses 360a to 360h for attaching the key lock part are planted in the attachment area 360 inside the rear cover 270, and, corresponding to these bosses 360a to 360h, the lock plate 370 is provided with engagement parts 370a to 370d, an inclined surface part 370e and, on its bottom surface, with lock pieces 370f and 370g. As is clear from FIG. 14, the key cylinder 390 is fitted into the hole 410a in the turn plate 410 via the hole 400a of the key lock holder 400, and the turn plate 410 is integrally assembled in such a way as to be able to turn via the washer 420 and the attachment screw 430.

The engagement parts 370a, 370b and 370d of the lock plate 370 are engaged by the bosses 360a, 360b and 360d, and the engagement part 370c is engaged by the boss 360c via a spring 380.

With the key cylinder assembled as described above, the lock holder 400 is secured to the bosses 360e to 360h using the screws 400e to 400h. In this state, the lock pieces 370f and 370g face the windows 360i and 360j of the attachment part 360, and the front end part 410b of the turn plate 410 is located at the lowest position of the inclined surface part 370e of the lock plate 370.

When the key lock part has been assembled in the way described above, the lock plate 370 is in a state in which it floats slightly under the resilient force of the spring 380, and, when the special key 260 is inserted in the key cylinder 390 and turned from the OFF position to the ON position, the turn plate 410 turns, its front edge part 410 rises following the inclined surface part 370e of the lock plate 370, the lock plate 370 is pushed down against the resilient force of the spring 380, and the lock pieces 370f and 370g protrude from the holes 360i and 360j.

As a result, as shown schematically in FIG. 15 (a) and (b), because in the ON position in FIG. 15 (a) the lock pieces 370f and 370g have advanced into the area in which the key part 16a of the detachment member 16 of the apparatus main body 1 rotates, the detachment member 16 is prevented from being turned by the release lever 210 and the apparatus main body 1 and the anti-theft panel 200 are completely locked.

In contrast, because in the OFF position shown in FIG. 15 (b) the lock pieces 370f and 370g are withdrawn and the detachment member 16 is free to turn, the state of locking between the apparatus main body 1 and the anti-theft panel 200 is undone by the release lever 210.

As shown schematically in FIG. 16 (a) and (b), a lock-detection switch 440 is located close to the turn plate 410, and while in the OFF position shown in FIG. 16 (a) the detection switch 440 is not pressed and is OFF because the short-diameter part 410c of the turn plate 410 is facing the switch 440, in the ON position shown in FIG. 16 (b) the long-diameter part 410d comes to face and comes into contact with the switch 440 and therefore presses it and turns it ON as the turn plate 410 turns. Thus it is possible to detect the key lock.

FIG. 17 is one example of an electrical system for the anti-theft panel 200 constructed as described above: 450 is the control circuit (CPU: Central Processing Unit), its power source Vcc being supplied from the above-mentioned battery 270, and it is connected to the above-mentioned ultrasound transmission unit 230a, ultrasound reception sensor 230b, alarm speaker 240, switches 300a, 300b and 440, indicator 250, and variable resistor 290.

The switch 440 detects when the assembly has been locked by key as described above and, in response to the resulting detection signal, the control circuit 450 activates the ultrasound transmission unit 230a and the ultrasound reception sensor 230b.

At this time, if an intruder enters the vehicle, the ultrasound waves generated by the transmission unit 230a are reflected by the intruder, the sensor 230b receives the reflected waves and the control circuit 450 turns the alarm circuit 460 ON in response to the detection signal from the sensor 230b to generate an alarm from the speaker 240. Further, if the battery capacity is above a certain value when the switch 300b is ON, the indicator 250 will be lit. This allows the remaining battery capacity to be ascertained. Also, the sensitivity of the sensor 230b can be adjusted using the variable resistor 290 when the slide switch 300a is in the ON position.

It will be noted that the construction of the anti-theft panel 200 itself can be simplified if batteries are not incorporated and the connector 310 is used to supply electrical power from the apparatus main body.

As described above, the device of the present invention makes it possible to further improve anti-theft effects since it does not simply make the operating panel detachable, but it also allows the operating panel to be removed and another anti-theft panel to be attached to the electronic apparatus main body and it allows both of these panels to be locked by key, and the anti-theft panel can use a sensor to detect an intruder and give an audible alarm. Further, it will be even more advantageous, from the point of view of preventing theft, if a battery is incorporated in the anti-theft panel since the audible alarm will continue to be produced even if the electronic apparatus is removed.

FIG. 18 and FIG. 19 show another embodiment of the present invention, being an example of a configuration which renders removal of the electronic apparatus main body impossible by fitting the anti-theft panel to the vehicle-mounted electronic apparatus main body. In the figures, 101 is the electronic apparatus main body and 102 is a framing bracket which is secured to the vehicle. Two pairs of latching holes 102b to 102c are respectively formed in each of the two side surfaces of the framing bracket 102.

Meanwhile, latching leaf springs 101a in the shape of the Japanese symbol are attached to the sides of the electronic apparatus main body 101, this only being depicted on the right side in the figures. Latching clasps 101b and 101c are formed at the open end of the leaf spring 101a. These clasps 101b and 101c are designed to latch on to the latching holes 102b and 102c.

Further, two edges of the front face 110 of the electronic apparatus main body 101 are provided with insertion holes 103a and 103b. The insertion holes 103a and 103b are arranged so as to correspond to the latching clasps 101b and 101c and to allow the insertion of an unfastening tool 104 designed to pass through the insertion holes 103a and 103b and unfasten the latching clasps 101b and 101c from their latched state with the latching holes 102b and 102c. The unfastening tool 104 is formed in the shape of the Japanese symbol ("ko") in such a way as to fit with the shape of the leaf spring 101a.

In order to attach the electronic apparatus main body 101 to a vehicle, the main body 101 is inserted inside the framing bracket 102 so that the latching clasps 101b and 101c of the leaf spring 101a provided on the main body 101 engage with the latching holes 102b and 102c provided in the bracket 102, and the electronic apparatus main body 101 is latched to the bracket 102 under the urging force of the leaf spring 101a. In other words, the apparatus main body 101 is locked together with the bracket 102 as the latching clasps 101b and 101c pass through the latching holes 102b and 102c and are urged outward under the urging force of the leaf spring 101a.

In order to unfasten the latching clasps 101b and 101c and the latching holes 102b and 102c from their latched state, the tool 104 is inserted in the insertion holes 103a and 103b so that the leaf spring 101a is pressed by the tool 104 and the latching clasps 101b and 101c and the latching holes 102b and 102c are unfastened from their latched state.

Projections 2000a a and 2000b are provided corresponding to the insertion holes 103a and 103b at both ends of the anti-theft panel 200. Then, when the panel 200 is fitted to the front of the electronic apparatus main body 101 as described previously, the projections 2000a and 2000b end up covering the insertion holes 103a and 103b completely and the tool 104 cannot be inserted.

Consequently, it becomes impossible to remove the electronic apparatus when the anti-theft panel 200 has been locked by the key as described previously.

An embodiment such as that described above does not simply make the operating panel detachable, but it also allows the operating panel to be removed and another anti-theft panel to be locked by key to the electronic apparatus main body, and it makes it impossible to remove the electronic apparatus main body from the vehicle at the same time as the locking operation. The anti-theft effect can therefore be further improved.

FIG. 20 shows an example of another configuration of the circuitry incorporated into the anti-theft panel described above.

In FIG. 20, 455 is a comparator circuit, 465 is an indicator flashing circuit, 475 is a sensor power-source wait circuit, 485 is a timer circuit for sensitivity adjustment, 495 is an intruder-detecting sensor comprising an ultrasound transmission unit and a sensor which receives the ultrasound waves emanating from this unit, 505 is an indicator drive circuit, 515 is an indicator ON/OFF circuit, 525 is an alarm ON/OFF circuit, 535 is an alarm wait circuit, 545 is a sensor detection notification circuit, 555 is an alarm drive circuit, and 565 is an alarm.

The power source for the anti-theft circuit described above is supplied in parallel via the following three switches from the battery 575 incorporated in the panel.

More specifically, the comparator circuit 455 is connected to the battery 575 via a battery check switch 305b, the indicator flashing circuit 465 and the sensor power-source wait circuit 475 are connected to the battery 575 via a set switch 445 which is on when the key lock is on, and the timer circuit 485 for sensitivity adjustment is connected to the battery 575 via the test switch 305a.

The functions in the anti-theft circuit with the configuration described above are now explained.

(i) Battery Check Function

When the switch 305b is turned on, the output voltage from the battery 575 is input to the comparator circuit 455 where it is compared with a predetermined setting voltage supplied from a reference power source which is not depicted. As a result, when said battery output voltage is above the set voltage level, the battery is judged to be normal and the indicator drive circuit 50 responds to the comparison output of the comparator circuit 455 and lights the indicator 255. This check is only performed when the switch 305b is on.

(ii) Intruder Detection and Alarm Function

When the assembly is locked by key as described hereinabove, the set switch 445 is turned on, the power source is supplied to the flashing circuit 465, a flash signal is input to the indicator drive circuit 505 thereby, and as a result the indicator 255 flashes. This flashing of the indicator 255 continues until the set switch 445 is turned OFF, in other words until the key-operated lock is undone, and indicates that the assembly has been locked by key.

Further, when the set switch 445 is turned on as described hereinabove, the power source is supplied to the sensor power source wait circuit 475 and, after waiting for the predetermined amount of time set in this circuit, the power source is supplied to the intruder-detection sensor 495. Because, as described, the sensor 495 enters the active state after a predetermined amount of time has elapsed even when the assembly has been locked by key, the assembly can to this extent be prevented from emitting an alarm even when, for example, the driver goes outside the vehicle for a short time and then returns.

If there is an intruder when the power source is supplied to the sensor 495, this is detected by the sensor 495 and the resulting detection signal is input to the alarm ON/OFF circuit 525 and the indicator ON/OFF circuit 515, and, if the circuit 525 is on, the respective ON signals are input without further ado to the alarm wait circuit 535 and the sensor detection notification circuit 545. It will be noted that the alarm ON/OFF circuit 525 is on except in the test mode discussed hereinbelow.

Thus, in the first instance, the sensor detection notification circuit 545 inputs an ON signal to the alarm drive circuit 555 for only a predetermined short time after activating a one-shot multivibrator (not depicted) which is incorporated, and the alarm 565 produces an alarm for only this short time.

Consequently, if the driver who set the key lock himself enters the vehicle after it has been set, he can ascertain that the sensor 495 is operating, and since at this time the alarm wait circuit 535 makes the ON signal output wait for a predetermined set time, the driver can turn the power source off before the alarm 565 continues to sound by undoing the key lock so as to turn the set switch 445 off within this period.

Further, if someone other than the driver who locked the assembly by key intrudes, he will not be able to turn the set switch 445 off even after the alarm 565 has sounded for the above-mentioned short-time due to the sensor detection notification circuit 545, and therefore, after the wait for the above-mentioned predetermined set time, the ON signal from the alarm wait circuit 535 continues and is input to the alarm drive circuit 555 and an audible alarm continues to be output by the alarm 565.

(iii) Test Mode Function (Sensor Sensitivity Adjustment Function)

It is also possible to configure the system in such a way that the sensor sensitivity can be adjusted in a test mode function. The test switch 305a is, for example, a non-lock push-pull switch and is only on while it is depressed. Upon depressing the switch 305a, the power source is supplied to the timer circuit 485 for sensitivity adjustment, and the power source is supplied to operate the circuits 495, 515 and 525 for only the predetermined time set by the timer circuit 485, the arrangement being such that it prevents anyone forgetting to cancel the test mode.

Because the intruder-detection sensor 495 is in the active state and the indicator ON/OFF circuit 515 is also in the ON state while the timer circuit 485 for sensitivity adjustment is operating, if a detection signal is output from the sensor 495, it is sent via the above-mentioned circuit 515 to the indicator drive circuit 505, and the indicator 255 is lit. Consequently, while the timer circuit 485 is operating, the indicator 255 can be simply set, while being viewed, in such a way as to achieve an appropriate sensor sensitivity by adjusting the variable resistor 295 for adjusting sensor sensitivity.

Because the alarm ON/OFF circuit 525 is off during this time, the alarm 565 does not sound.

Moreover, the power source can be obtained from a battery 575 incorporated in the panel, but it may also be obtained from the vehicle-mounted battery.

As described above, the present invention can improve anti-theft effects since it uses a special anti-theft panel to prevent theft of electronic apparatuses and can produce an audible alarm upon detecting an intruder by activating a sensor with a key lock. Moreover, it is practical since it employs measures whereby the driver who locked the assembly by key himself can easily confirm that the anti-theft circuit is active and adjust the sensitivity and the like.

Those skilled in the art will appreciate that various adaptations and modifications of the just-described preferred embodiment can be configured without parting from the scope and spirit of the invention. Therefore, it is to be understood that, within the scope of the appended claims, the invention may be practiced other than as specifically described herein.

What is claimed is:

1. An anti-theft device for an electronic apparatus having an operating panel which is detachable from an electronic apparatus main body comprising:

an anti-theft panel constructed in such a way that it can be attached to and detached from the electronic apparatus main body when the operating panel has been removed;

a lock means, including a pivotally rotating member on the electronic main body and two locking pieces arranged to be advanced into the rotation area of the rotating member, operated by a key, for securing the anti-theft panel to the electronic apparatus main body by a key operation.

2. An electronic vehicle audio system for mounting in the dashboard of a vehicle comprising:

housing for storing electronic components of the audio system;

a first detachable control panel for mounting on the housing to enable operator control input of the electronic component;

a second detachable panel for mounting on the housing;

connection means on the housing for removably mounting either the first or second detachable panels; and means for locking the second detachable panel to the housing to deter theft, including a pivotally rotating member provided on the second panel and two locking pieces arranged to be advanced into the rotation area of the rotating member.

3. An anti-theft device for an electronic apparatus having an electronic operating panel which is detachable from an electronic apparatus main body comprising:

an electronic anti-theft panel constructed in such a way that it can be attached to and detached from the electronic apparatus main body when the operating panel has been removed; and a lock means on the anti-theft panel, operated by a key, for securing the anti-theft panel to the electronic apparatus main body by a key operation, the anti-theft panel includes a detection device which can detect the proximity of a human and an alarm device which responds to the output of the detection device, the detection device and alarm device can enter an operating state when the panel has been locked by the key to the electronic apparatus main body.

4. The anti-theft device of claim 3, wherein the detection device comprises an ultrasound transmission unit, and a sensor which receives ultrasound waves transmitted from the transmission unit and reflected by a human.

5. The anti-theft device of claim 3, which further comprises a battery incorporated in the electronic anti-theft panel;

an indicator;

a battery check switch; and means for comparing the output of the battery due to the operation of the battery check switch with a predetermined reference value, and lighting the indicator in response to the results of the comparison.

6. An anti-theft device for an electronic apparatus having an operating panel which is detachable from an electronic apparatus main body comprising:

an anti-theft panel constructed in such a way that it can be attached to and detached from the electronic apparatus main body when the operating panel has been removed;

a lock means, including a pivotally rotating member provided on one of the anti-theft panel and the electronic main body and at least one locking piece arranged to be advanced into the rotation area of the rotating member, operated by a key, for securing the anti-theft panel to the electronic apparatus main body by a key operation.

7. The anti-theft device of claim 1, wherein the number of locking piece arranged to be advanced into the rotation area is two.

8. The anti-theft device of claim 1, wherein the rotating member is provided on the electronic main body.

9. The anti-theft device for an electronic apparatus of claim 1, wherein the anti-theft panel incorporates a battery, a detection device and an alarm device, the detection device and the alarm device being supplied with power from the battery in response to a locking operation of the anti-theft panel to the electronic apparatus main body by the key.

10. The anti-theft device for an electronic apparatus of claim 9, wherein the anti-theft panel is equipped at the panel face with at least one indicator for displaying the remaining capacity of the battery.

11. The anti-theft device of claim 1, which further comprises a bracket into which an electronic apparatus main body can be inserted, the electronic apparatus main body is provided with a pair of latching clasps, the bracket is provided with latching holes corresponding to the latching clasps and with unfastening member insertion parts provided on the electronic apparatus main body in such a way as to allow an insertion of the unfastening member which unfastens the latching clasps of the electronic apparatus main body from their latched state with the latching holes, and with projections provided in the anti-theft panel in such a way as to cover the insertion parts when fitted by the anti-theft panel.

12. The anti-theft device of claim 11, wherein the anti-theft panel includes a means for locking by key onto the electronic apparatus main body.

13. The anti-theft device for an electronic apparatus of claim 1, wherein the lock means is equipped with a key-receiving part provided on the panel face of the anti-theft panel, an operating member which moves in linked movement with the turning of a key inserted in the key-receiving part, and a lock member which locks or releases a detachment member on the side of the electronic apparatus main body under the action of this operating member.

14. The anti-theft device for an electronic apparatus of claim 13, wherein the anti-theft panel is also equipped with a detection device which can detect the proximity of a human and an alarm device which responds to the output of the detection device, the detection device and alarm device can enter an operating state when the panel has been locked by the key to the electronic apparatus main body.

15. The anti-theft device of claim 14, wherein the detection device comprises an ultrasound transmission unit, and a sensor which receives ultrasound waves transmitted from the transmission unit and reflected by a human.

16. The anti-theft device for an electronic apparatus of claim 14, which is further equipped with a power source supply means which supplies power to the detection device in response to locking by the lock means, and a first control means which activates the alarm for only a predetermined time period from the generation of the detection output from the sensor.

17. The anti-theft device for an electronic apparatus of claim 16, wherein the power source supply means is only operative after a predetermined time period from the activation of the text mode switch.

18. The anti-theft device for an electronic apparatus of claim 16, which further comprises a battery incorporated in the anti-theft panel;

an indicator;

a battery check switch; and means for comparing the output of the battery due to the operation of the battery check switch with a predetermined reference value, and lightening the indicator in response to the results of the comparison.

19. The anti-theft device for an electronic apparatus of claim 16, which is further equipped with a test mode switch, an indicator which indicates that the detection device is in an operational mode, and a second control means, including a timer circuit arranged to be triggered by an operation of the test mode switch, which operates the detection device and the indicator for only a predetermined period having been designated by the timer circuit after the switch is activated.

20. The anti-theft device for an electronic apparatus of claim 19, which further comprises a flashing display means which makes the indicator flash when the switch is on.

21. An electronic vehicle audio system for mounting in the dashboard of a vehicle comprising:

a housing for storing electronic components of the audio system;

a first detachable control panel for mounting on the housing to enable operator control input of the electronic components;

a second detachable panel for mounting on the housing;

connection means on the housing for removably mounting either the first or second detachable panels; and means for locking the second detachable panel to the housing to deter theft, including a pivotally rotating member provided on one of the first and second panels and at least one locking piece arranged to be advanced into the rotation area of the rotating member.

22. The electronic vehicle audio system of claim 21, wherein the second detachable panel includes an alarm member that will be activated if the second detachable panel is improperly removed.

23. The system of claim 21, wherein the number of locking pieces arranged to be advanced into the rotation area is two.

24. The system of claim 21, wherein the rotating member is provided on the second panel.

25. The electronic vehicle audio system of claim 21, wherein the second detachable panel includes a sensor for detecting an intruder who enters the vehicle.

26. The electronic vehicle audio system of claim 25, wherein the second detachable panel includes an alarm member that is connected to the sensor.

27. An anti-theft device for a vehicle mounted electronic audio apparatus with an electronic operating panel having user control members and a first connector member, which is detachable from an electronic apparatus main body having a second connector member, comprising:

an anti-theft electronic panel constructed in such a way that it can be attached to and detached from the electronic apparatus main body when the electronic operating panel has been removed, including means for providing an alarm function, if the anti-theft electronic panel is forcibly removed; and a lock means on the anti-theft electronic panel, operated by a key, for securing the anti-theft electronic panel to the electronic apparatus main body by a key operation.

28. The anti-theft device for an electronic apparatus of claim 27, wherein the lock means is equipped with a key receiving part provided on a panel face of the anti-theft electronic panel, an operating member which moves in linked movement with the tuning of a key inserted in the key-receiving part, and a lock member which locks or releases a detachment member on the side of the electronic apparatus main body under the action of this operating member.

29. The anti-theft device for an electronic apparatus of claim 28, wherein the anti-theft electronic panel is also equipped with a detection device which can detect the proximity of a human and an alarm device which responds to the output of the detection device, the detection device and alarm device can enter an operating state when the anti-theft electronic panel has been locked by the key to the electronic apparatus main body.

30. The anti-theft device of claim 29, wherein the detection device comprises an ultrasound transmission unit, and a sensor which receives ultrasound waves transmitted from the transmission unit and reflected by a human.

31. The anti-theft device for an electronic apparatus of claim 29, wherein the anti-theft electronic panel incorporates a battery, and the detection device and alarm device are supplied with power from the battery when the anti-theft panel has been locked to the electronic apparatus main body by the key.

32. The anti-theft device for an electronic apparatus of claim 31, wherein the anti-theft electronic panel is equipped at the panel face with at least one indicator for displaying the remaining capacity of the battery.

* * * * *